Aug. 18, 1970 W. LOHFF 3,524,960

METAL COATED PLASTIC PLUG AS ELECTRICAL CONNECTOR AND SWITCH

Filed Nov. 4, 1968

INVENTOR

William Lohff

United States Patent Office 3,524,960

Patented Aug. 18, 1970

3,524,960
METAL COATED PLASTIC PLUG AS ELECTRICAL CONNECTOR AND SWITCH

William Lohff, Naperville, Ill., assignor to The Richardson Company, Melrose Park, Ill., a corporation of Ohio Filed Nov. 4, 1968, Ser. No. 773,103
Int. Cl. H01h *19/28;* H05k *1/04*
U.S. Cl. 200—155 8 Claims

ABSTRACT OF THE DISCLOSURE

As an electrical connector, a plastic plug having a metal coating over a portion of its external surface and a fusible plastic tip. After insertion of the plug in an aperture of a circuit board, the tip is fused and forms a rigid mechanical bond which does not conduct electricity to short adjacent circuits and also holds the metal coating in place to form the electrical connection.

BACKGROUND OF THE INVENTION

This invention relates to electrical connectors constructed of plastic and metal and more particularly to plastic plugs with partial metal coatings and fusible plastic tips in which fusing of the tips provides rigid mechanical bonds with circuit boards, integrated circuits and the like.

Printed circuit boards are constructed of insulating substrates and metal patterns on one or both surfaces of the substrates to form electrical circuits. Among the methods of forming electrical connections with these circuits, one is carried out by inserting a metal plug into an aperture on the board and soldering the plug to an adjacent circuit or circuits to provide both electrical and mechanical connections. Problems associated with this method involve susceptibility of the soldered joint to cracking and shorting of other circuits during the soldering process.

Another method of forming electrical connections is carried out by inserting a metal strip or strips embedded in plastic into preformed apertures on the electrical circuit board. In this method the metal strips are forced against particular metal sections of the circuit to form the desired connections. In some instances, the plastic and apertures are shaped to interconnect so as to form a force fit. However, problems are also associated with this method since shocks and other improper handling can frequently result in a release of the connection.

SUMMARY

Briefly, the invention involves the development of a plastic plug having a metal connection usually in the form of a partial surface coating of metal and a fusible plastic tip. The plug is shaped to be inserted in an aperture or apertures associated with a circuit on an electrical circuit board and the tip is fused to form a rigid mechanical bond with the board. In this manner, the metal coating forms the desired electrical connection with the electrical circuit while the fused plastic tip provides a rigid mechanical bond without electrical shorting problems associated with metal solders. In addition, the plastic is usually flexible and provides increased resistance to shocks and other forms of physical abuse without breaking the electrical connection.

DETAILED DESCRIPTION

Figure 1:
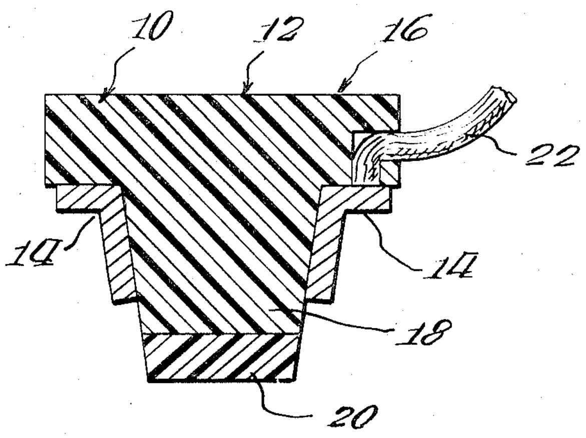
FIG. 1 is a sectional view of a plastic plug with a partial metal coating, an external electrical lead, and a fusible tip. In this illustration, the tip is composed of a different plastic from that in the main part of the plug body.

In FIG. 1, numeral 10 indicated a plastic plug composed of a plastic section 12 and a partial metal coating 14. In this embodiment, the plug is in the form of a T with enlarged end in the form of cap 16, a central portion in the form of shaft 18, and a second end in the form of fusible tip 20. Tip 20 is illustrated as being composed of a second plastic with regard to cap 16 and shaft 18. In addition, an external electrical connector as illustrated by wire 22 is electrically connected to metal coating 14.

Figure 2:
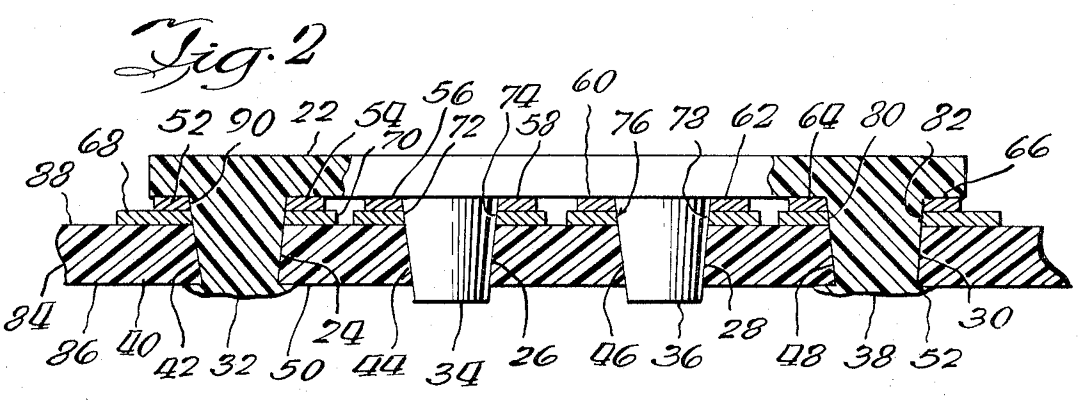
FIG. 2 is a partial sectional view of a circuit board with a plurality of apertures and a plug having a plurality of plastic tips fused to the board.

In FIG. 2, plug 22 is illustrated and has a plurality of extending members 24, 26, 28 and 30, with corresponding tips 32, 34, 36 and 38. Circuit board 40 as illustrated has apertures 42, 44, 46 and 48 into which the tips 32–38 are inserted. Tips 32 and 38 have been fused to form rigid mechanical bonds with surfaces 50 and 52 of board 40. Also illustrated are metal coatings 52–66 and associated circuit connectors 68–82 of board 40. While the embodiment illustrates a plurality of metal coatings, it is understood that a metal coating can be applied over a predetermined surface of one or more extending members.

As illustrated, electrical circuit board 40 comprises an insulating substrate 84 having top and bottom surfaces 86 and 88 and at least one electrical circuit is illustrated by connector 68 on surface 88. The substrate 84 has at least one aperture as illustrated by aperture 42 extending between surfaces 86 and 88 at a location adjacent to circuit connector 68. A plastic plug 22 is inserted into aperture 42 and has on its surface 90 metal coating 52 to provide an electrical connection with metal connector 68. Plug 22 also has a fused plastic tip 32 forming a rigid mechanical connection with surface 50 of substrate 84.

In the particular embodiment, substrate 84 has a plurality of apertures 42–48 and plug 22 has a plurality of tips 32–38 inserted therein with tips 32 and 38 being fused to form the desired mechanical connections.

Figure 3:
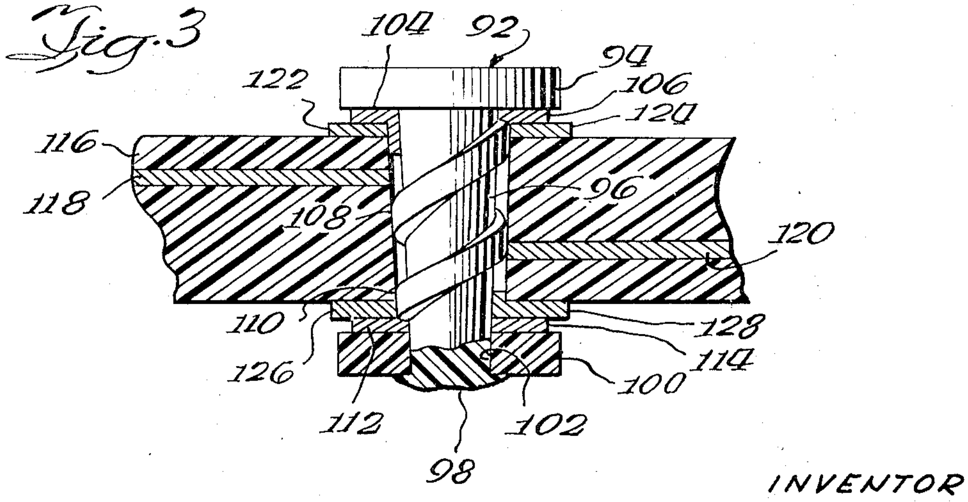
FIG. 3 is a plan view of a plug in combination with a circuit board. The plug has a particular pattern of metal and a collar which connects two or more electrical circuits and is capable of varying electrical connections to embedded circuits in a circuit board.

In FIG. 3, modified plug 92 is illustrated in the form of a T with cap 94, shaft 96 and tip 98 in combination with collar 100. Collar 100 has aperture 102 and is designed to fit over plastic tip 98 to expose and permit convenient fusing of the tip to form the desired mechanical connection. Metal coatings 104–114 represent a surface or surfaces of metal over a predetermined area of plug 92. Circuit board 116 has embedded circuits 118 and 120 in addition to connectors 122–128. The metal coating of plug 92 is illustrated as including a spiral coating 108 and 110 interconnected to metal coatings 122–124 and 126–128. In this manner, plug 92 can be rotated to connect or disconnect circuits 118 and 120 without disconnecting the surface circuits.

As illustrated, the plug of this invention is composed of a plastic core with a partial metal coating and a fusible plastic tip. Advantageously, the plastic core is flexible to absorb shock and provide an effective electrical connection, and preferably, both the core and tip are composed of the same plastic. Suitable plastics for both the core and the tip include thermoplastic organic polymers such as butadiene polymers, styrene polymers, acrylic polymers and the like and preferably hydrocarbon polymers based on butadiene. This is particularly desirable when the metal coating is applied by electroless metal deposition. Suitable plastics for the core alone include thermosets such as phenolics, epoxies, melamines and the like with the tip composed of the above thermoplastics.

The metal coating is applied by known techniques of vacuum deposition, electroless metal deposition, or metal bonding. When the method coats the entire surface, excess metal is removed by chemical etchants to form the desired metal connectors. With electroless metal deposition, usually a second metal layer is electroplated over the first layer. Suitable metal coatings include copper, nickel, silver, gold, and the like and preferably copper. With electroless metal deposition, the copper layer is usually on a nickel undercoat.

The tip is usually not metal coated and is therefore exposed and fusible. In forming the mechanical connection, the tip is fused at temperatures below that at which damage to the circuit board would occur. The actual temperature is dependent on the particular plastic in the tip and usually below about 200–300° C.

However, fusing of the tip can be carried out by means other than the direct application of heat. In some instances, the aperture and plug can be shaped to provide a contact surface between the two and ultrasonic energy used to fuse the plastic. In this manner, it is not necessary that the tip protrude from the board.

The use of the plug with an electrical circuit board involves a method of forming an electrical connection in a circuit on an electrical circuit board having at least one aperture extending between the top and bottom surfaces of the board at a location adjacent to the circuit. This method comprises inserting the plastic plug in the aperture to form the electrical connection by means of the metal coating and fusing of the fusible tip to form a rigid mechanical connection with the board.

While the invention has been described in conjunction with specific examples thereof, these are illustrative only. Accordingly, many alternatives, modifications and variations will be apparent to those skilled in the art in the light of the foregoing description, and it is therefore intended to embrace all such alternatives, modifications, and variations as to fall within the spirit and broad scope of the appended claims.

I claim:

1. As an electrical connector, a plastic plug shaped to be inserted into an aperture associated with an electrical circuit, the plug having a metal coating over a predetermined surface to provide the electrical connection and a fusible exposed plastic tip, the metal coating being capable of forming an electrical connection with the electrical circuit, the plug also including an electrical conductor connected electrically to the metal coating.

2. The plastic plug of claim 1 having one end enlarged and the other end comprising the fusible exposed plastic tip.

3. The plastic plug of claim 1 having one end in the form of a cap, having the central portion in the form of a shaft, and having the second end in the form of a fusible plastic tip.

4. The plastic plug of claim 1 wherein the plastic is a flexible organic polymer.

5. The plastic plug of claim 4 wherein the fusible tip is composed of a butadiene polymer.

6. A plastic plug shaped to be inserted into a plurality of apertures associated with an electric circuit, the plug having a plurality of extending members and a fusible plastic tip on the end of each member, the plug also having a metal coating over a predetermined surface of at least one member.

7. An electrical circuit board comprising an insulating substrate having top and bottom surfaces and at least one electrical circuit on at least one of said surfaces, the substrate having a plurality of apertures extending between said surfaces at a location adjacent to said circuit, a plastic plug having a plurality of extending members inserted into said apertures, at least two of said members each having on its surface a metal coating to provide an electrical connection with said circuit, and at least one of the metal coated members having a fused plastic tip forming a rigid mechanical connection with said substrate.

8. An electrical circuit board comprising an insulating substrate having top and bottom surfaces and electrical circuits exposed on both said surfaces and an additional electrical circuit embedded in said substrate, the substrate having at least one aperture extending between said surfaces and adjacent to said exposed and said embedded circuit, a plastic plug disposed into said aperture and extending beyond the opposite surface, a plastic collar disposed around the extending end of said plug and on the adjacent circuit, the exposed end of said plug having a fused plastic tip forming a rigid mechanical connection with said collar, the plug and collar having on each surface a metal coating providing electrical connection between said exposed circuit and the embedded circuit, the metal coating on the plug adjacent to the embedded circuit being located so that rotation of the plastic plug and collar electrically connects and disconnects the embedded circuit from said exposed circuits.

References Cited

UNITED STATES PATENTS 3,148,356 9/1964 Hedden.

DARRELL L. CLAY, Primary Examiner

U.S. Cl. X.R.

29—626; 174—68.5; 317—101; 339—17